F. GUTMANN.
COLLAPSIBLE VELOCIPEDE.
APPLICATION FILED SEPT. 13, 1912.
1,106,939.
Patented Aug. 11, 1914.
2 SHEETS—SHEET 1.
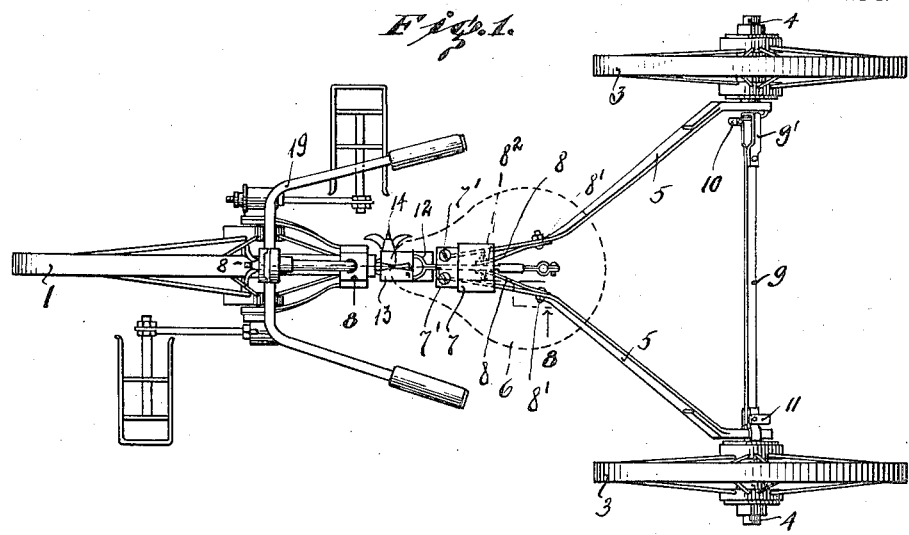
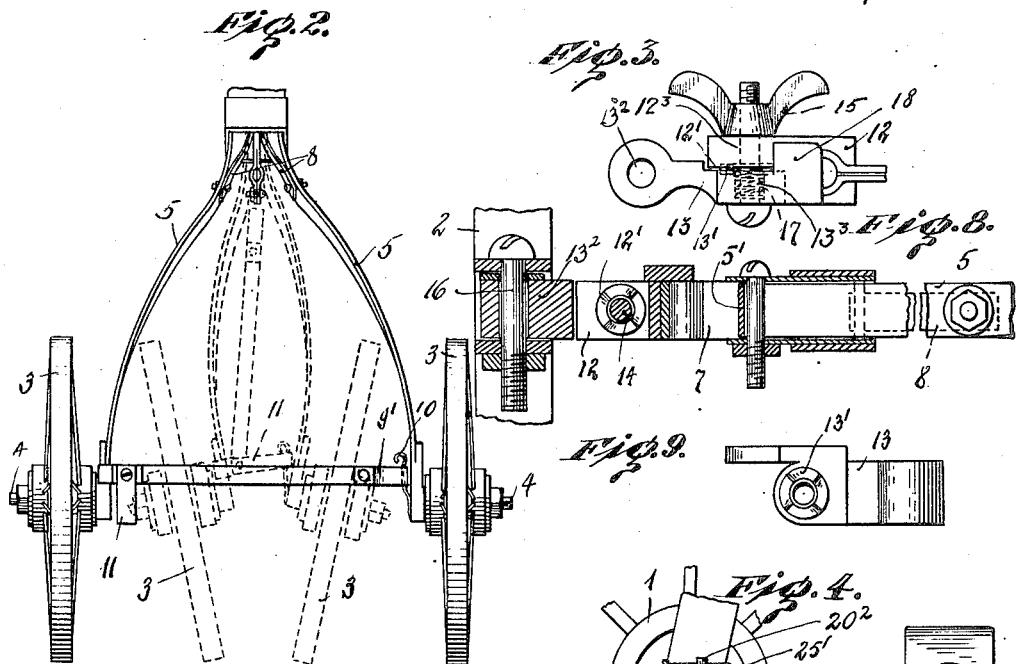
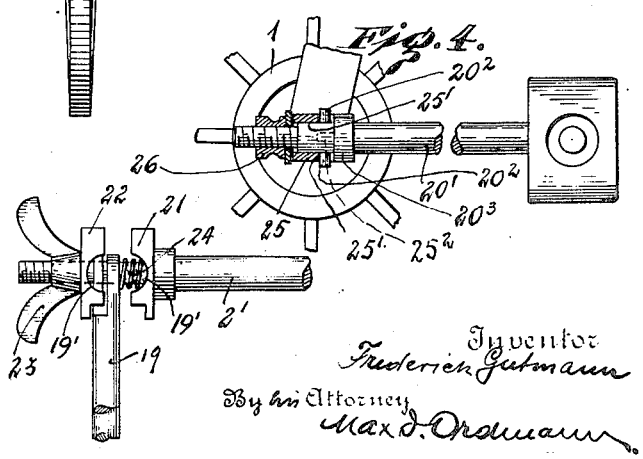
Witnesses:
C. S. Ashley
A. M. Stenlick
Inventor
Frederick Gutmann
By his Attorney
Max J. Ordmann F. GUTMANN.
COLLAPSIBLE VELOCIPEDE.
APPLICATION FILED SEPT. 13, 1912.
1,106,939.
Patented Aug. 11, 1914.
2 SHEETS—SHEET 2.
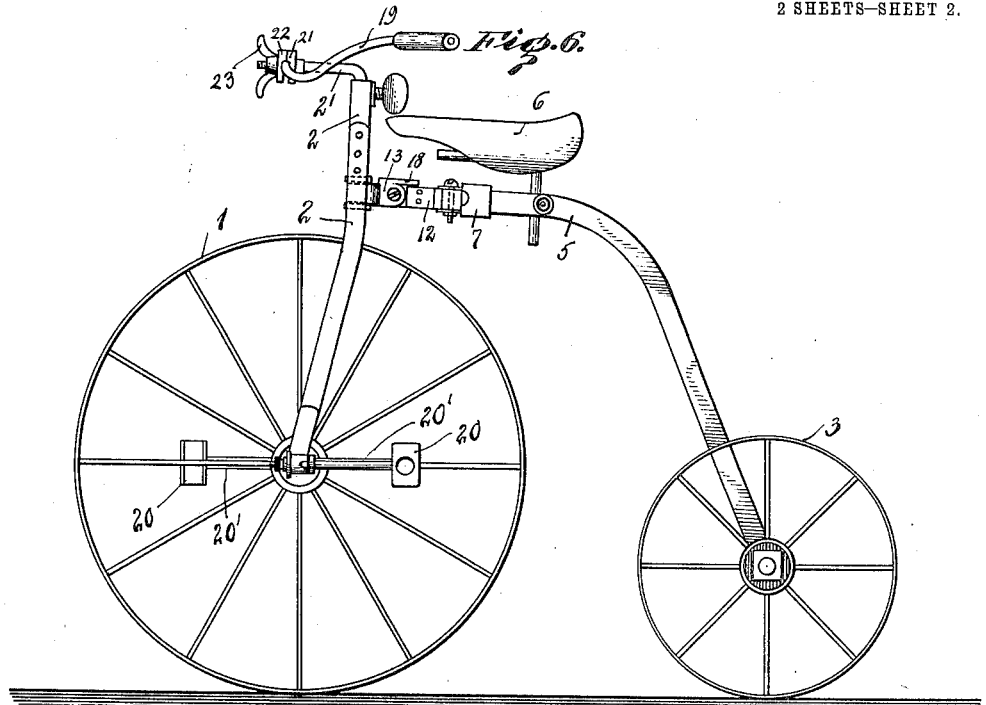
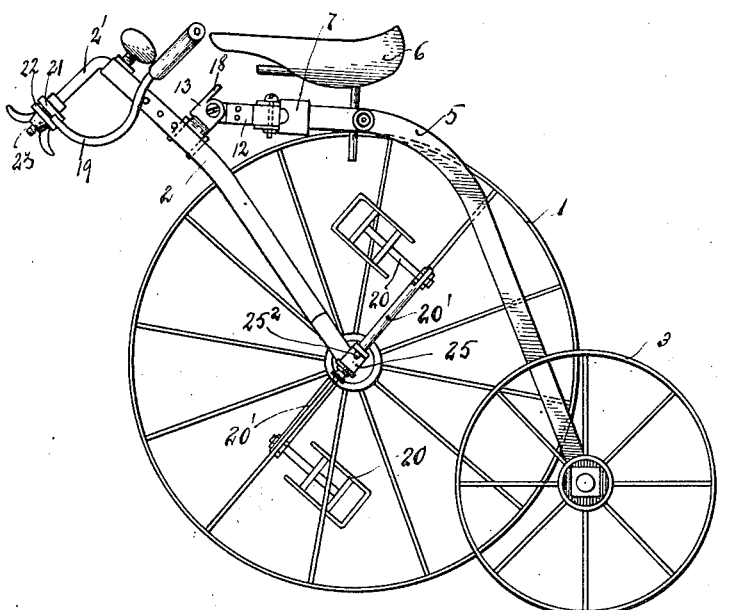

UNITED STATES PATENT OFFICE.

FREDERICK GUTMANN, OF NEW YORK, N. Y.

COLLAPSIBLE VELOCIPEDE.

1,106,939. Specification of Letters Patent. Patented Aug. 11, 1914.

Application filed September 13, 1912. Serial No. 720,129.

*To all whom it may concern:*

Be it known that I, FREDERICK GUTMANN, a subject of the Emperor of Austria-Hungary, residing at New York, in the county of New York and State of New York, have invented certain new and useful Improvements in Collapsible Velocipedes, of which the following is a specification.

The present invention relates to cycle wheels, particularly children's tricycles, and has for its object to provide a construction which will allow of the folding up of the cycle wheel in order to save space in apartments for storing the same or to facilitate the packing of such wheels for shipment.

My invention will be fully understood from the accompanying drawings, in which similar reference letters denote corresponding parts and in which—

Figure 1 is a top plan view of a tricycle in unfolded position; Fig. 2 is a rear end view thereof; Figs. 3, 4 and 5 are enlarged details of construction; Fig. 6 is a side view of the unfolded wheel; Fig. 7 is a similar view of the wheel in folded position; Fig. 8 is a section on line 8—8 of Fig. 1 and Fig. 9 is a detail.

In the present example I have shown a children's tricycle, but I wish it to be understood, that my invention may be utilized for all kinds of cycle wheels, with the difference, that for instance, bicycles having only one rear wheel, the mechanism hereinafter described for folding the rear wheels will be dispensed with.

With reference to the drawings 1 denotes the front or steering wheel which, as with ordinary cycle wheels, is journaled in the forked part 2 which forms the front part of the cycle frame.

3, 3 denotes the rear wheels of the tricycle of which each is borne in well known manner on short axles 4. The inner ends of these axles are suitably fixed to bars 5, 5 which extend rearwardly from a part carrying the saddle 6 and which form the rear part of the cycle frame. The cycle frame is not as with ordinary cycle wheels a rigid piece, but as will be presently described the front and rear parts thereof are yieldingly or tiltably connected to each other. To this end the upper central part 7 which carries the saddle 6 is rigid and at one end is provided with pivots or pins 7'. The upper end of each bar 5 is formed with cylindrical sockets 5' freely engaging around a pivot 7' of the rigid part 7, so that the bars 5 are capable of swinging horizontally toward and away from one another. Normally, that is to say, in unfolded position of the cycle wheel, the bars 5 are held in their extended position by plate springs 8 which at one end, as at 8', are secured to the bars 5 and at their inner ends as at $8^2$ are secured to the rigid part 7 of the frame. The rigid part 7 is hollow and open at the rear end, so that the inner ends of the bars 5 extend into the same, and the side walls of said part 7 serve to limit the extent to which the bars 5 can be swung apart.

To lock the rear wheels 3 in unfolded position, I provide a cross bar 9, which is pivoted or hinged to one of the bars 5 and which at its opposite end is formed with a loop 9' to engage a hook 10 projecting from the opposite bar (Figs. 1 and 2). This bar 9 is of such a length that when its loop 9' engages the hook 10 it will hold the two rear wheels stretched in operative position. A shorter loop 11 or like member is hinged or pivotally secured to the same bar 5, to which the bar 9 is pivoted, to be slipped over the hook 10 when the bars 5 are in folded position, *i. e.* when the same are swung into close proximity to each other, (as shown by dotted lines in Fig. 2).

The central rigid member 7 has a forward extension 12 which with a short member 13 forms part of a hinge joint. The adjoining surfaces of these two members 12 and 13 are provided with teeth 12', 13' adapted to grip one another so as to securely hold the members 12, 13 rigidly connected when the front wheel is in unfolded or operative position. The headed pin 14 passing through the perforations $12^3$, $13^3$ and being a part of the hinge joint is screw-threaded at one of its ends and carries a thumb nut 15 for tightening the hinge. The member 13 is at its front end provided with a socket $13^2$ which is freely borne on a vertical pin 16 fixed in the fork 2, permitting the latter, and consequently the front wheel, to swing horizontally for steering purposes. On the other hand the joint between the member 12 and 13 permits the front wheel, when the nut is slackened to swing around the horizontal pin 14 in vertical direction, so that the same may be folded in the manner shown in Fig. 7. Furthermore, in order that the members 12 and 13 become automatically disengaged from one another upon the slackening of the nut 15 a coil 17 is provided around the pivot 14 which projects toward the member 13. A rigid horizontal projection 18 extending from the member 13 is adapted to engage the member 12, when the front wheel is adjusted in operating position and to thus prevent an accidental tilting of the front wheel. To avoid other protruding parts when the wheel is stored and to facilitate the packing of the wheel for shipment, the handle 19 and the pedals 20 may also be made foldable. To this end the handle 19 is made of two parts which are tiltably borne on the steering rod 2' of the fork 2. In operative or unfolded position the two parts of the handle are engaged in lateral notches of sockets 21, 22 of which 21 is fixed to the rod 2' and the other 22 is capable of being tightened in position by means of a thumb nut 23 working on the threaded end of the rod 2'. A spring 24 arranged between the two sockets 21, 22 tends to disengage the latter upon the slackening of the nut 23.

The pedals 20 are adjustably borne in sockets 25 carried by the axle of the steering wheel 1. The crank part 20' of the pedals is provided with diametrically opposed laterally projecting pins 20² which can be made to engage vertically superposed notches 25' or lateral notches 25². When the pedals are so adjusted that their pins 20² engage the lateral notches then they are in operative position. When their pins 20² engage the vertically superposed notches 25', then the pedals 20 which in operative position project laterally, extend vertically and do not form laterally protruding parts. Nuts 26 working on the threaded ends of the crank rods 20' are provided, which in conjunction with collars 20³ fixed to said rods 20' will serve to tighten the pedals in either position against the sockets 25, (Fig. 4).

What I claim and desire to secure by Letters Patent is:

1. In a tricycle, a frame, comprising a rigid central part, a rear part, composed of flexible members, the upper ends of which are pivotally connected to the central part to turn laterally, and a foldable rigid member between the lower ends of said first named members.

2. In a tricycle, the combination with the rear wheels, of a frame comprising a rigid central part, a rear part, composed of two independently movable spring actuated flexible members, each member carrying a rear wheel, a pivoted connection between each member and said central part and a rigid foldable member between the lower ends of said first named members, said foldable member being adapted when in operative position to stretch the said wheels apart and when lifted to permit the latter to approach each other.

3. In a tricycle, the combination with the rear wheels, of a frame comprising laterally movable flexible members each carrying a rear wheel, a tiltable rigid member between these members to hold the same apart, and means for locking the said members in contracted position.

4. In a tricycle frame, a front part, an intermediate part and flexible rear members, a pivotal connection between said front part and said intermediate part permitting said front part to swing downwardly and rearwardly, pivotal connections between said rear parts and said intermediate part permitting said rear parts to swing laterally, and means between said rear parts to hold the same apart in operative position and to permit their folding when in inoperative position.

In testimony whereof I affix my signature in presence of two witnesses.

FREDERICK GUTMANN.

Witnesses:
  MAX D. ORDMANN,
  JOHN T. CARMODY.